Aug. 16, 1932.  B. S. MINOR ET AL  1,871,630
THRUST BEARING
Filed Jan. 11, 1930

Inventors.
William H. Clapp
Burt S. Minor
Attorney.

Patented Aug. 16, 1932

1,871,630

UNITED STATES PATENT OFFICE

BURT S. MINOR, OF SAN PEDRO, AND WILLIAM H. CLAPP, OF PASADENA, CALIFORNIA

THRUST BEARING

Application filed January 11, 1930. Serial No. 420,134.

This invention relates generally to rotary oil well drilling swivels. The thrust plates and anti-friction rollers forming the usual bearing in rotary swivels are subjected to considerable vibration or hammering action during drilling operations, especially so when drilling through hard formations. This hammering usually results from play between the rollers and thrust plates and is very detrimental to such parts.

A chief object of this invention is to provide a means for automatically taking up any slack or clearance in the bearings of rotary well drilling swivels.

This object is attained by the disclosure herein set forth by the following description of the accompanying drawing, in which.

Figure 1:
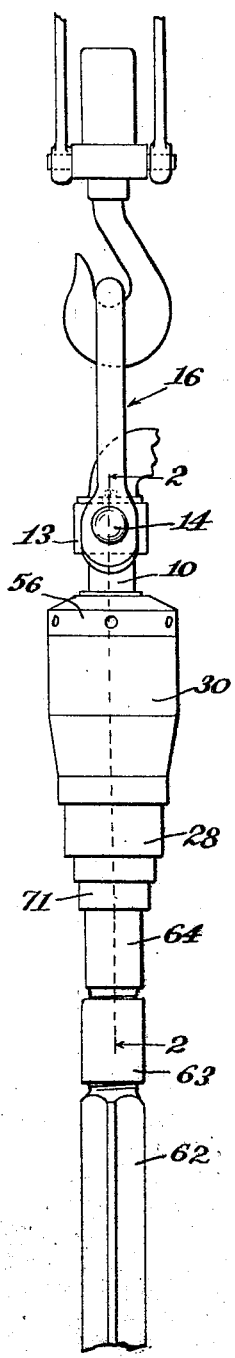
Fig. 1 is a side elevation of a swivel in which the invention is embodied.
Figure 2:
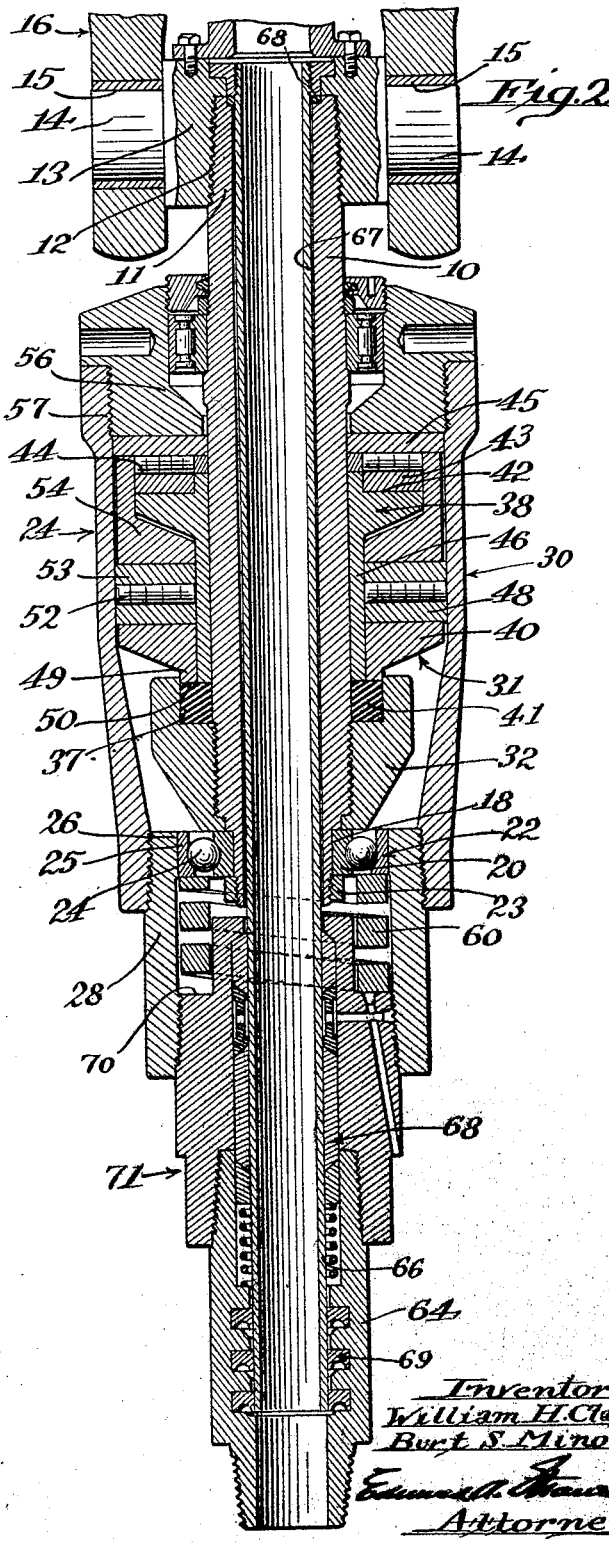
Fig. 2 is an enlarged vertical sectional view taken on line 2—2 of Fig. 1.

Referring more specifically to the drawing, 10 designates the swivel stem, the upper end 11 of which is connected preferably by screw threads 12 to a block 13 having trunnions 14 extending into openings 15 of a bail 16. The lower end of the stem terminates in a reduced diameter portion 18 upon which is mounted the inner race 20 of a combination radial and thrust bearing 22 which is retained in position by a nut 23.

A plurality of steel balls 24 are mounted between the race 20 and an outer race 25 mounted in the bore 26 of a member 28 screw threaded into the lower end of a housing 30 in which is mounted a thrust bearing generally designated at 31, this bearing forming the subject matter of an invention of William H. Clapp, bearing Serial No. 420,132, filed in the Patent Office January 11, 1930.

The bearing 31 consists of a pair of thrust plates 38 and 40, the lower ends of which engage the surface of a ring 41 mounted in a recess 37 formed in a collar 32 screw threaded to the lower end of the stem 10. Ring 41 is formed of lead or a metal having a low modulus of elasticity, and serves to equally distribute the load between the thrust plates and rollers therebetween, arranged in the housing as follows.

Thrust plate 38 has a flat upper face 42 upon which rests a ring 43 engaged by antifriction rollers 44 which in turn are engaged by a ring or race plate 45. The thrust plate is preferably formed integral with a shank 46 encircling the stem 12 with its lower face 47 engaging the surface of the ring 41. Thrust plate 40 is slidably mounted on the shank 46 and has a flat upper face engaged by a ring 48 and an annular boss or depending flange 49, the bottom face 50 of which engages the ring 36. A plurality of antifriction rollers 52 are mounted on the ring 48 which are in turn engaged by a ring 53, a spacer 54 being interposed between the rings 45 and 53.

The above described bearing assembly is held in position by a head 56 screw threaded as designated at 57 into the upper end of the housing, the underside of which engages the ring 45.

The drill stem or "kelly" 62 is connected by a coupling 63 to a member 64 screw threaded into the fitting 65 in the usual manner. A wash pipe or tube 66 extends through an opening 67 in the stem and terminates adjacent the lower end of the member 64, suitable packing generally designated at 68 and 69 forming a fluid tight seal around the upper and lower ends of the wash pipe.

This invention resides in means for automatically taking up any slack or play between the rollers and thrust plates or races of the thrust bearing 31, or other bearings of a similar character employed in rotary well drilling swivels, and consists of an expansion coil spring 60, its upper end engaging the outer race 25, and its lower end engaging the upper face 70 of a fitting 71 threadedly connected to the members 28 and 64.

In assembling, the spring is placed in the member 28 expanded, then compressed by screwing the fitting into said member. The reaction or expansion of the spring then tends to draw the housing downwardly in relation to the stem, such movement being permitted by the sliding clearance between the outer race 25 and the bore 26 in the member 28.

From the foregoing it will be seen that after the parts are assembled any clearance or play existing between the bearings, or any other play which should develop due to wear, will be automatically taken up by expansion of the spring.

In operation the housing, outer ball race 25, member 28, fitting 71, and spring 60 rotate together with the drill pipe, the stem connected with the traveling block remaining stationary.

We claim:

1. In a device of the character described, a stationary stem, a collar secured to said stem, a thrust bearing including a plurality of thrust plates and anti-friction roller therebetween mounted on said stem, the thrust plates of said bearing resting on said collar, a housing rotatably mounted on said thrust bearing, a combined thrust and radial bearing including an inner race mounted on said stem and engaging said collar and an outer race slidably mounted in said housing and an expansion coil spring engaging the outer race of said combined thrust and radial bearing, and a shoulder on said housing, whereby upon expansion of said spring any slack or play between the thrust plates and anti-friction roller of said bearing will be automatically taken up.

2. In a device of the character described, a stationary stem having a collar thereon, an antifriction thrust bearing mounted on said steam and engaging said collar, a housing enclosing and engaging said thrust bearing, a combined radial and thrust bearing mounted on said stem below said collar and expansion spring means engaging said combined thrust and radial bearing and a shoulder formed on said housing.

3. In a device of the character described, a stationary stem, a collar secured to said stem, an antifriction thrust bearing mounted on said stem and engaging said collar, a housing encircling said thrust bearing and rotatable therewith, a combined radial and thrust bearing mounted on said stem with its inner race engaging said collar and its outer race slidably mounted in said housing, an expansion coil spring under compression engaging the outer race of said combined radial and thrust bearing and a shoulder formed on said housing.

4. In a device of the character described, a stationary stem, a collar secured to said stem, an antifriction thrust bearing mounted on said stem and engaging said collar, a housing encircling said thrust bearing and rotatable therewith, a combined radial and thrust bearing mounted on said stem with its inner race engaging said collar and its outer race slidably mounted in said housing, an expansion coil spring encircling said stem and engaging the outer race of said combined radial and thrust bearing, and a member screw threaded into the lower end of said housing and compressing said expansion coil spring.

5. In a device of the character described, a stationary stem, a collar secured to said stem adjacent the lower end thereof, a thrust bearing including a plurality of thrust plates and rollers therebetween mounted on said stem with the thrust plates engaging said collar, a housing encircling said thrust bearing, a head mounted in the upper end of said housing and engaging the upper race of said bearing, a combined radial and thrust bearing mounted on said stem with its inner race engaging said collar and its outer race slidably mounted in said housing, an expansion coil spring under compression engaging the outer race of said combined radial and thrust bearing and a shoulder formed on said housing.

6. In a device of the character described, a stationary stem having a collar thereon, an antifriction thrust bearing mounted on said stem and engaging said collar, a housing enclosing and engaging said antifriction thrust bearing, a thrust bearing mounted on said stem below said collar, and expansion spring means engaging said thrust bearing and a shoulder formed on said housing.

7. In a device of the character described, a stationary stem, a collar secured to said stem, an antifriction thrust bearing mounted on said stem and engaging said collar, a housing encircling said antifriction thrust bearing and rotatable therewith, a thrust bearing mounted on said stem and engaging said collar, and an expansion coil spring under compression engaging said thrust bearing and a shoulder formed on said housing.

In testimony whereof we affix our signatures.

BURT S. MINOR.
WM. H. CLAPP.